United States Patent [19]

Fehr et al.

[11] Patent Number: 4,697,893
[45] Date of Patent: Oct. 6, 1987

[54] MICROSCOPE WITH A BINOCULAR TUBE

[75] Inventors: Erwin Fehr, Heerbrug; Andreas Schaefer, Belgach, both of Switzerland

[73] Assignee: Wild Heerbrugg AG, Heerbrugg, Switzerland

[21] Appl. No.: 749,273

[22] Filed: Jun. 27, 1985

[30] Foreign Application Priority Data

Jun. 29, 1984 [CH] Switzerland .......................... 3157/84

[51] Int. Cl.$^4$ ....................... G02B 21/22; G02B 21/00
[52] U.S. Cl. ...................................... 350/516; 350/520
[58] Field of Search ................................ 350/513–520, 350/507, 511–512, 522, 570

[56] References Cited

U.S. PATENT DOCUMENTS

| | | | |
|---|---|---|---|
| 2,133,509 | 10/1938 | Hall et al. ............................. | 350/514 |
| 3,994,558 | 11/1976 | Schulz et al. ........................ | 350/516 |
| 4,217,025 | 8/1980 | Takenaka . | |
| 4,448,498 | 5/1984 | Muller et al. ........................ | 350/516 |
| 4,492,441 | 1/1985 | Hopkins ............................... | 350/516 |
| 4,518,231 | 5/1985 | Muchel et al. ....................... | 350/516 |

FOREIGN PATENT DOCUMENTS

| | | | |
|---|---|---|---|
| 2525798 | 1/1978 | Fed. Rep. of Germany . | |
| 3229516 | 2/1984 | Fed. Rep. of Germany . | |
| 3318011 | 11/1984 | Fed. Rep. of Germany ...... | 350/515 |
| 1172051 | 11/1969 | United Kingdom ................ | 350/520 |

*Primary Examiner*—William H. Punter
*Attorney, Agent, or Firm*—Helfgott & Karas

[57] ABSTRACT

A microscope includes a generally L-shaped motion box and an optical support located on a horizontal leg of the motion box. A binocular tube is fixed to the optical support. An objective changer is guided in the horizontal leg of the motion box and supports a first objective for stereoscopic observation and a second objective. The second objective is the objective of a conventional microscope. A beam splitter connected directly downstream of the second objective distributes the incident light into the two observation channels of the microscope. With this stereomicroscope, a single manipulation switches from normal stereoscopic observation to binocular observation with much greater magnification.

13 Claims, 7 Drawing Figures

MICROSCOPE WITH A BINOCULAR TUBE

FIELD OF THE INVENTION

The present invention relates to a microscope with a binocular tube and exchangeable objectives.

BACKGROUND OF THE INVENTION

A microscope with a binocular tube is described in German Pat. No. 25 25 798 (WILD AG). This microscope is used as a stereomicroscope. An objective constituting the main objective common to the two viewing channels of the microscope is connected upstream of the binocular tube. The main objective can be laterally displaced until the optical axis of the main objective coincides with the optical axis of one of the two subsystems of the twin optical system. This displacement considerably improves the image quality in that subsystem.

In practice, it is necessary to considerably magnify a particular point on an object, which point has just been imaged by the main objective. However, this conventional microscope is unsuitable for this purpose.

SUMMARY OF THE INVENTION

An object of the present invention is to provide a microscope with a binocular tube which can be easily and quickly operated to significantly increase the magnification of a point on an object, after the object has been scanned by stereoscopic observation.

Another object of the present invention is to eliminate the disadvantages of conventional microscopes with binocular tubes.

The foregoing objects are obtained by a microscope, comprising a binocular tube, an optical support coupled to the binocular tube, a microscope twin optical system, and an objective changer supporting first and second objectives. The twin optical system has first and second subsystems mounted in the optical support. The objective changer is coupled to the optical support for relative movement between first and second positions and for moving the objectives relative to the optical support between operative and inoperative positions. The first objective provides stereoscopic observation, while the second objective has an optical axis coinciding with the optical axis of the second subsystem only when the second objective is in its operative position.

In this manner, each of the objectives can be individually and selectively connected upstream of the twin optical system [since light passes upward from the objectives to the system, the objectives are disposed upstream of the system] by movement of the changer between its first and second positions. This permits the operator to increase the magnification quickly by a simple manual manipulation of the objective changer. In order to obtain the increased magnification, the second objective has a shorter focal length than the first objective.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS

Figure 1:
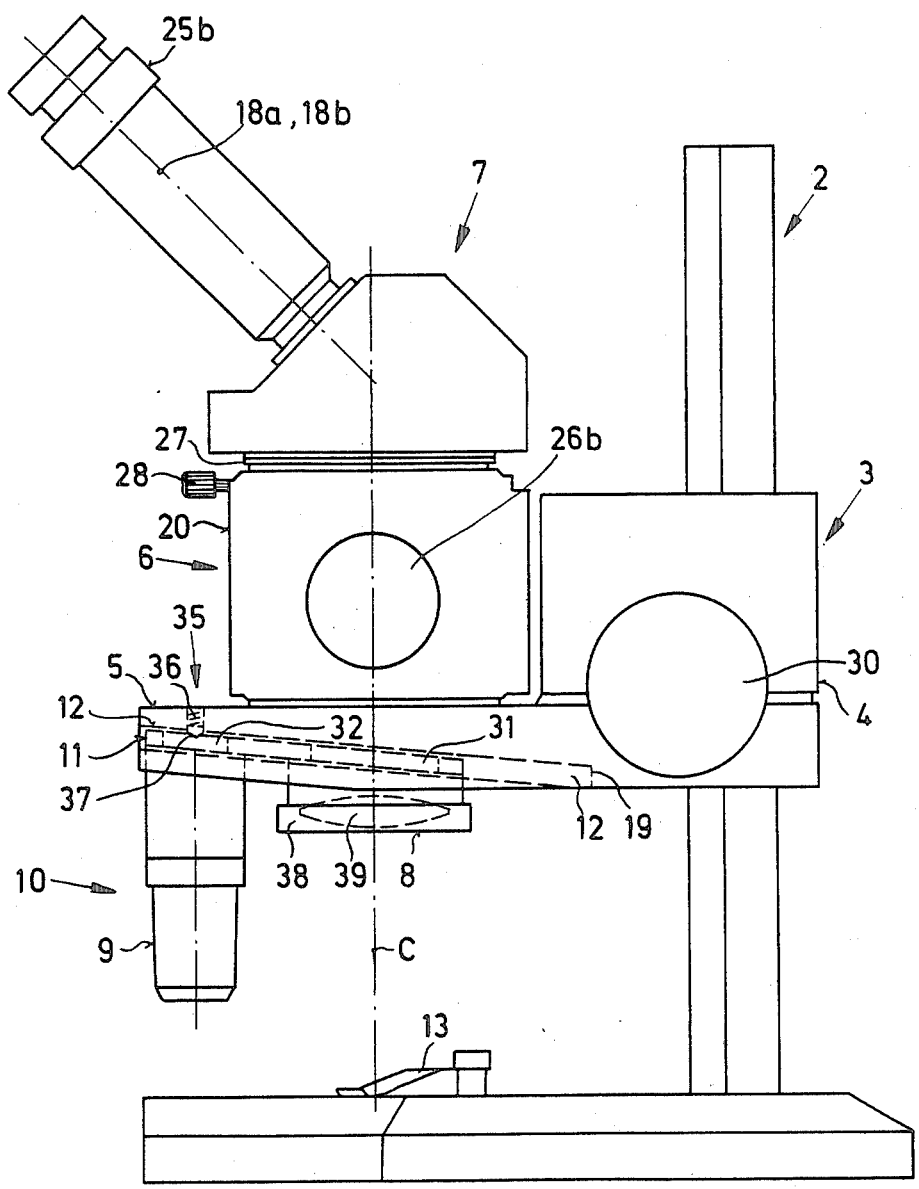
FIG. 1 is a side elevational view of a microscope according to the present invention with the stereoscopic observation objective in the operative position.
Figure 2:
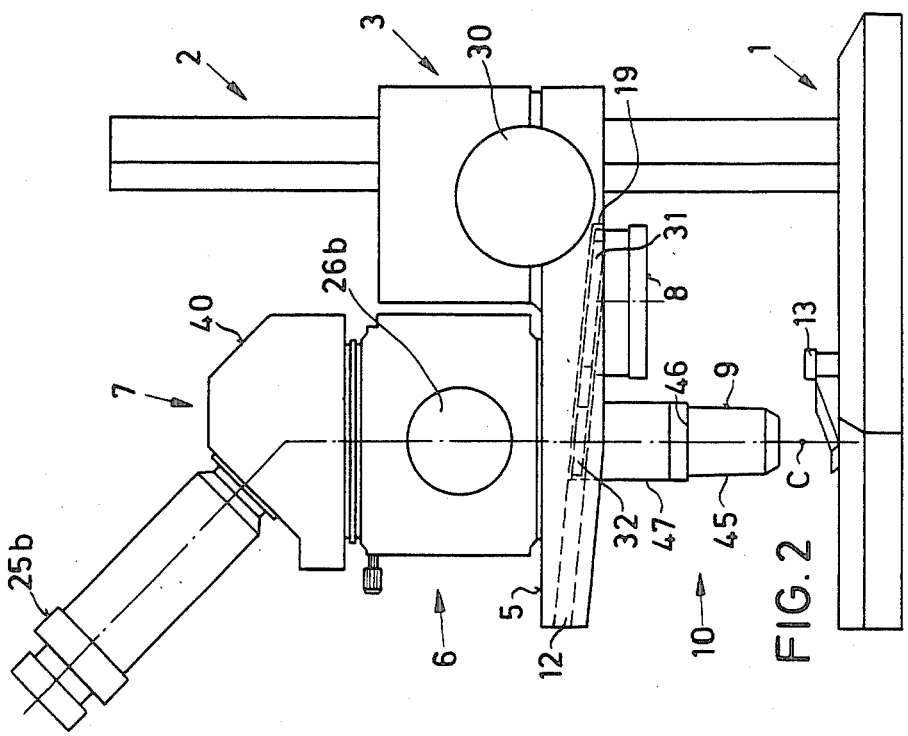
FIG. 2 is a side elevational view of FIG. 1 with the second objective in its operative position.
Figure 4:
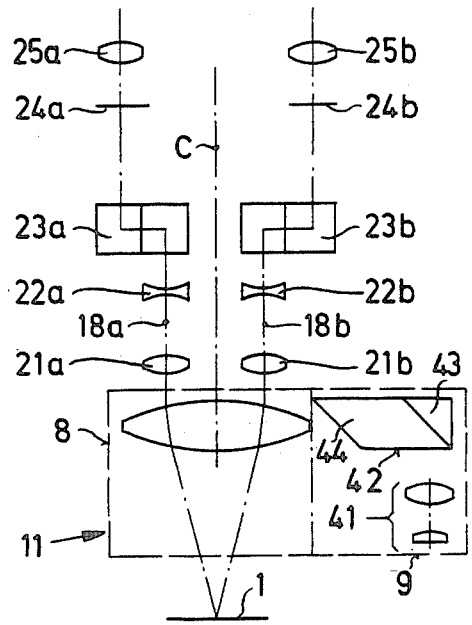
FIG. 4 is a diagrammatic illustration of the optical path in the microscope of FIG. 1 with the main objective in its operative position for stereoscopic observation.

The microscope illustrated in FIG. 1 comprises a stand 1 in the form of a plate. Stand 1 supports a vertical upright 2 supporting a vertically movable motion box 3. The motion box is substantially L-shaped, with the vertically directed part or the vertical leg 4 being hollow and surrounding upright 2. In first or vertical part 4 of motion box 3, means for displacing the motion box 3 along the upright 2 are provided. Of this displacing means, the control elements or knobs 30 thereof are illustrated in FIGS. 1 and 2.

The second part or horizontal leg 5 of the L-shaped motion box 3 is flat and advantageously constructed as a tongue. An optical support 6 is supported on motion box horizontal leg 5 and supports a binocular tube 7. The elements of a twin optical system are provided in optical support 6 and binocular tube 7. The horizontal leg 5 of motion box 3 serves as a support for the remaining components 6 and 7 of the microscope, and is provided with an objective changer 10 for objectives 8 and 9 of the microscope. This changer 10 can be constructed as a displacement means, which will be described in greater detail hereinafter.

On the top of stand 1, object clips 13 are provided with only the right-hand clip being shown. In FIGS. 3 to 7, the optical axes or paths 18a and 18b of the subsystem for each half of the twin optical system are illustrated. In the drawings, portions of the left-hand optical system or viewing channel include the designation "a", while the portions of the right-hand optical system or viewing channel include the designation "b".

Optical support 6 has a substantially cylindrical casing 20 in which lenses 21a, 21b, 22a, and 22b are located. These lenses are followed by image erecting prisms 23a and 23b (FIGS. 3 to 7), and together form the optical element of a magnifification changer or focusing arrangement and tube lens system. Prisms 23a and 23b are followed by intermediate image planes 24a and 24b and eyepieces 25a and 25b. The optical elements of the magnification changer are activated by operating knobs 26a and 26b.

Binocular tube 7 has a casing 40 inserted at its lower, roughly tubular portion 27 into the casing 20 of optical support 6. Tube 7 can be fixed to support 6 with the aid of a set screw 28. Eyepieces 25a and 25b are fixed to casing 40 of binocular tube 7, while the casing 40 contains image erecting prisms 23 and 23b.

Figure 3:
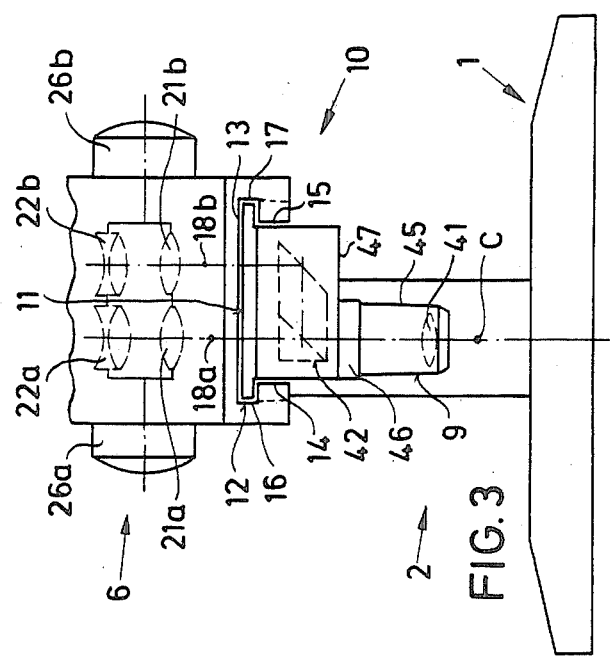
FIG. 3 is a partial front elevational view of the microscope of FIG. 1 with a beam splitter and the second objective in operative positions.

Objective changer 10 shown in FIGS. 1 to 3 is constructed as a displacement means, although changer 10 can also be constructed as a turret head. The displacement means 10 has a plate-like slide 11 with a bottom portion on which objectives 8 and 9 are fixed. Slide 11 is elongated and objectives 8 and 9 are successively positioned thereon in the longitudinal direction of slide 11. Through openings or ports 31 and 32 are provided in slide 11 through which the light from objectives 8 and 9 can pass to the remainder of the microscope optics.

Second flat part 5 of motion box 3, supporting components 6 and 7 of the microscope, includes a guide recess 12 for slide 11. Recess 12 opens at its front into the free end face of part 5. The transverse cross-sectional configuration of recess 12 is illustrated in FIG. 3. Recess 12 has a flat bottom surface 13, and side walls 14 and 15 extending generally at right angles to bottom surface 13 such that recess 12 is open at its bottom. Side walls 14 and 15 are provided, in the area connected to bottom surface 13, with grooves 16 and 17. Grooves 16 and 17 extend parallel to the side walls and have a substantially rectangular cross-sectional configuration. The edge portions of the plate forming slide 11 are located in grooves 16 and 17. Plate or slide 11 can be moved in the longitudinal direction of grooves 16 and 17.

Within tongue 5, recess 12 terminates at an end wall 19 (FIG. 2) which plate 11 can abut. This position of slide 11 can precisely position one of the two objectives 8 or 9. In the present case, second objective 9 is brought to its operative position when slide 11 engages end wall 19.

Due to the generally very limited working distance of a standard microscope objective, it is advantageous to arrange changer 10 such that objective 9 for the high power magnification is raised from the object upon switching to stereoscopic observation using objective 8. This raising can be achieved by displacing objectives 8 and 9 in a sloping plane, or, as in a conventional microscope, with a turret head. Objectives 8 and 9 need only be interchangeable when limited demands are made.

The construction of the displacement means or slide changer 10 is illustrated in FIGS. 1 to 3. A locking device 35 for slide or plate 11 can be provided and include a spring-mounted pin 36. The tip of pin 3 can engage a cavity 37 formed in the top surface of slide 11. Pin 36 is positioned adjacent to the free end of motion box second part 5. Cavity 37 is formed in the front area of slide 11. With the aid of locking device 35, the main objective 8 can be easily and reliably positioned in the microscope light path. As previously stated, second objective 9 can be positioned by the abutting slide 11 against end wall 19 of recess 12.

The main objective 8 is suitable for the stereoscopic viewing of an object and has a generally tubular barrel 38 fixed to slide 11 and containing objective lens or lens system 39. Port 31 in plate 11 is also located within barrel 38.

The second objective 9 has a casing 45, which in addition to the lenses 41 of the conventional microscope objective, also has a beam splitter 42 including a splitter prism 43 and an inclination prism 44. The beam splitter 42 is positioned between lenses 41 of second objective 9 and the magnification changer 21a,b and 22a,b in optical support 6. Beam splitter 42 is positioned such that its inlet part having splitter prism 43 is associated with the objective lenses 41. The first outlet part of beam splitter 42 containing the splitter prism 43 is located in the second viewing channel b, while the second outlet part of beam splitter 42 is located at the free end of inclination prism 44 and associated with the first viewing channel a.

Casing or barrel 45 of second objective 9 houses objective lenses 41 and has a threaded portion 46. Threaded portion 46 is threadedly engaged with casing 47. Casing 47 is approximately parallelepipedic and houses beam splitter 42. This casing 47 is fixed to slide plate 11 and surrounds second port 32 in plate 11.

Figure 5:
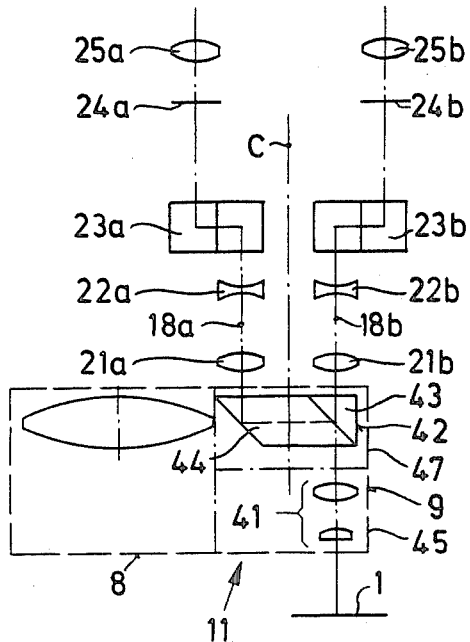
FIG. 5 is a diagrammatic illustration of the optical path of the microscope of FIG. 1 with the second objective and the beam splitter connected upstream of the remainder of the optical system.
Figure 6:
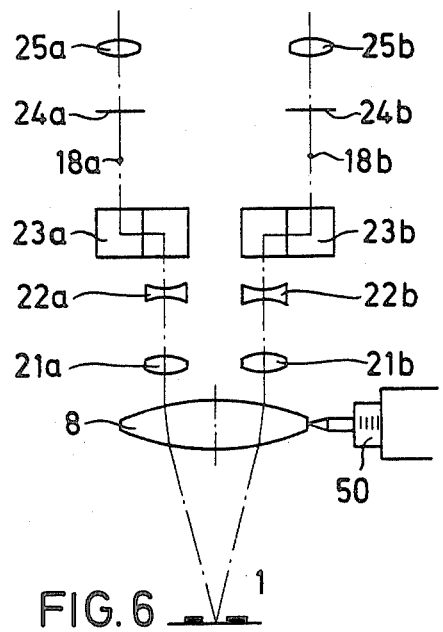
FIG. 6 is a diagrammatic illustration of the microscope of FIG. 1 including a length measuring device connected to the main objective.
Figure 7:
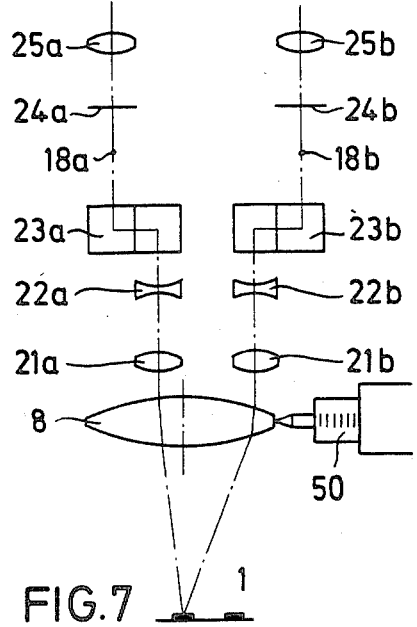
FIG. 7 is a diagrammatic illustration of the microscope of FIG. 6 with the main objective displaced from its central position by a specific amount measured by the length measuring device.

The two objectives 8 and 9 and slide 11 form integral parts of the displacement means 10. These components of the microscope are surrounded in FIGS. 4 and 5 by a frame represented in broken line form. Objectives 8 and 9 are separated from one another by a dot-dash line. For drawing purposes and in view of the diagrammatic form of FIGS. 4 and 5, objectives 8 and 9 are illustrated as if they are displaceable in the plane of optical paths 18a, and 18b. The diagrammatic representation of FIG. 4 corresponds to the positioning in FIG. 1, while FIG. 5 diagrammatically illustrates the position of slide 11 shown in FIGS. 2 and 3.

By a single manipulation, the microscope is switched from normal stereoscopic observation to binocular observation with a much greater magnification. Compared with the conventional microscopes, the image is upright and is in the right way. Thus, survey observation can be stereoscopic with a greater viewing field, while the transition to a more precise observation of the same point of an object can be achieved by merely displacing the objectives. By a suitable choice of the slope of guide recess 12 in motion box 3, the transition can be achieved while maintaining the constant sharpness of the image, independently of whether the objectives are in optical axis c of the microscope.

This instrument is particularly suitable as a hobby or teaching microscope. It can be used for quality control purposes in industry. With stereoscopic survey observation, a testpiece can be very rapidly scanned, and possible faults can then be immediately assessed under high magnification.

The displaceability of objectives 8 and 9 of the microscope permit measuring of distances on the observed object. A corresponding embodiment of the present microscope is diagrammatically shown in FIGS. 6 and 7. The first objective 8, used for the stereoscopic observation of the object, is coupled to a length or linear measuring device 50. Device 50 can be a scale with vernier reading, a micrometer screw, a mechanical dial gauge, an electronic sensor with digital display, etc. In the represented embodiment, the micrometer screw 50 is used for length or linear measurement purposes. The use of a micrometer screw offers an additional advantage in that it can also be used to drive the objective displacement. In addition, a cross-hair eyepiece is to be used. If the eyepiece successively sights two points on the object, then the objective displacement between the two sightings exactly corresponds to the distance between the two points. Such measurements can also be performed if the changer 10 has no second objective.

If two length measuring devices 50 are coupled to main objective 8 and are arranged at right angles to one another, and if the displacement means 10 can move in the horizontal plane, the operator can simultaneously measure objects in two coordinate directions, e.g., in the X and Y-directions. A known coordinate stage can then be used as the displacement means.

Compared with the measuring method using an eyepiece screw micrometer, no faults result from the distortion of the optical system. In addition, recalibration is not required after the magnification has been changed. The distance to be measured can also be greater than the viewing field. Compared with measuring microscopes with object or tube displacement, the mass to be moved in the present microscope is smaller.

While various embodiments have been chosen to illustrate the invention, it will be understood by those skilled in the art that various changes and modifications can be made therein without departing from the scope of the invention as defined in the appended claims.

What is claimed is:

1. A microscope comprising:
    a binocular tube;
    an optical support coupled to said binocular tube;
    a microscope twin optical system with first and second subsystems mounted in said optical support, said first system having a first optical axis, said second subsystem having a second optical axis;
    an objective changer coupled to said optical support for relative movement between first and second positions
    first and second objectives mounted on said changer for movement relative to said optical support between operative and inoperative positions, said first objective providing stereoscopic observation, said second objective providing monocular observation and having an optical axis coinciding with the second optical axis only when in the operative position thereof; and
    object supporting means disposed in fixed position below the changer and objectives;
    whereby each of the objectives can be individually and selectively connected upstream of said twin optical system by movement of said changer between said first and second positions without shifting the position of the object supporting means or countershifting the tube, support or optical system.

2. A microscope according to claim 1 wherein said second objective has a shorter focal length than said first objective.

3. A microscope according to claim 1 wherein said optical support is located between said objective changer and said binocular tube, and comprises magnification changing means.

4. A microscope according to claim 3 wherein said optical support is supported by a motion box and a stand, said stand having an upright, said motion box having a first part surrounding said upright and a second part extending from said first part and being flat and tongue-shaped, said optical support resting on said second part, said objective changer and said objective being coupled to a bottom portion of said second part.

5. A microscope according to claim 3 wherein said second objective is housed in a barrel, said barrel being detachably coupled to a casing housing a beam splitter between said second objective and said optical support and in said optical axis of said second objective.

6. A microscope according to claim 5 wherein said casing is threadedly coupled to said barrel.

7. A microscope according to claim 1 wherein said objective changer movably supports said objectives such that said objectives move in a plane generally perpendicular to an axis of said optical support.

8. A microscope according to claim 7 wherein said objective changer comprises displacement means and length measuring means coupled to said displacement means.

9. A microscope according to claim 4 wherein said objective changer comprises a slide carrying said objectives and is displaceable in said second part of said motion box adjacent to object support means.

10. A microscope according to claim 9 wherein said slide is movable toward and away from said upright of said stand.

11. A microscope according to claim 10 wherein said slide is movable in a direction sloping downwardly and toward said upright of said stand.

12. A microscope according to claim 9 wherein a locking means, mounted in said motion box, releasably retains said slide in said first position.

13. A microscope according to claim 12 wherein said locking means comprises a spring biased pin mounted in said second part of said motion box, said slide having at least one cavity for receiving said pin when said slide is in said first position.

* * * * *